B. H. WASHINGTON.
Cotton Planter.
No. 108,415.
Patented Oct. 18, 1870.
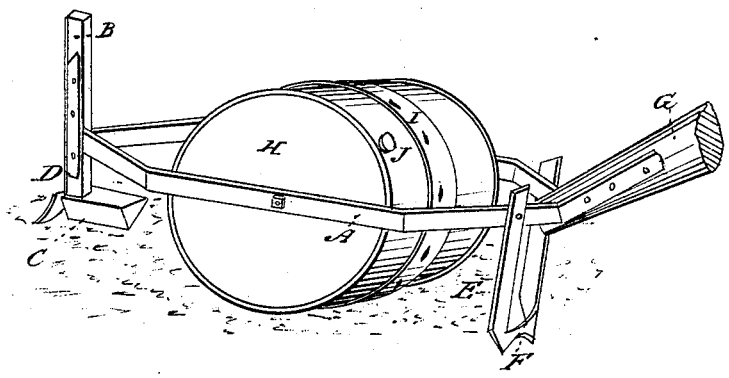
Fig. 1
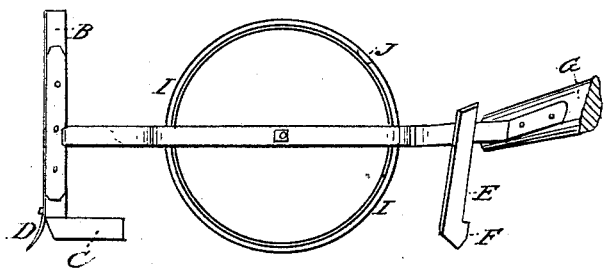
Fig. 2
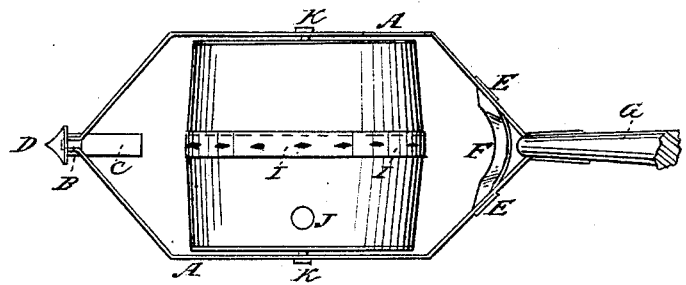
WITNESSES:
Frank Smyth
Edwin V. Sharp
INVENTOR:
B. H. Washington

United States Patent Office.

BEVERLY H. WASHINGTON, OF COLUMBIA COUNTY, GEORGIA.

Letters Patent No. 108,415, dated October 18, 1870.

IMPROVEMENT IN COTTON-PLANTERS AND FERTILIZER-DISTRIBUTERS.

The Schedule referred to in these Letters Patent and making part of the same.

To all whom it may concern:

Be it known that I, BEVERLY H. WASHINGTON, of Columbia County, State of Georgia, have invented a new and improved Cotton Planter and Fertilizer-Distributer; and I do hereby declare that the following is a full, clear, and exact description of the construction and operation of the same, reference being had to the annexed drawing making a part of this specification, in which—

Figure 1 is a perspective view.
Figure 2, a longitudinal elevation.
Figure 3, a transverse section.
A, frame.
B, part of frame for attachment of clevis and furrow-former.
C, furrow-former.
D, colter.
E, part of frame for attachment of coverer.
F, coverer.
G, block for attachment of handles.
H, hopper.
I I, apertures (diamond-shape) for exit of seed or fertilizer.
J, aperture for inserting seed, &c.
K, end of shaft of hopper.

The hopper H is so constructed in separate parts that one-half of it may be turned within the band which is rigidly fixed to the other half of the hopper, so as to bring the diamond-shaped apertures in it directly beneath, and coinciding with similar apertures in said band, whereby the openings may be graduated to the quantity of seed which it may be desired to sow.

Said hopper may be of any convenient shape, as cylindrical, conoidal, barrel-shaped, spherical, &c.

Mode of operation is as follows:

The cotton-seed or fertilizer having been placed in the vessel of hopper H, through the aperture J, the horse is made to walk in the furrow previously laid off for the fertilizer, or on the ridge or bed for the planting of cotton, and the diamond-shaped apertures I I having been arranged so as to deliver the desired quantity per acre, the distribution is accomplished by the vessel or hopper being made to revolve on the ground with the apertures over the furrow, and a regular, sure delivery of seed or fertilizer is thereby obtained.

I do not claim the colter D, furrow-former C, or coverer F; but

What I do claim and desire to secure by Letters Patent, is—

1. The hollow hopper H, constructed and operated as described.

2. The hopper H, on frame A, combined with furrow-opener C, colter D, coverer F, and block G, and arranged and operating as described.

B. H. WASHINGTON.

Witnesses:
   E. T. BENNETT,
   RICHARD W. MAHER.